United States Patent
Choi et al.

(10) Patent No.: US 8,199,279 B2
(45) Date of Patent: *Jun. 12, 2012

(54) LIGHT GUIDE PLATE AND BACKLIGHT ASSEMBLY USING THE SAME

(75) Inventors: Jin-Sung Choi, Cheonan-si (KR);
Byung-Yun Joo, Seoul (KR);
Min-Young Song, Seoul (KR);
Sang-Hoon Lee, Cheonan-si (KR);
Dong-Kwan Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1140 days.

This patent is subject to a terminal disclaimer.

(21) Appl. No.: 12/040,203

(22) Filed: Feb. 29, 2008

(65) Prior Publication Data

US 2008/0231590 A1    Sep. 25, 2008

(30) Foreign Application Priority Data

Mar. 19, 2007   (KR) .......................... 10-2007-0026397

(51) Int. Cl.
*G02F 1/1335* (2006.01)
(52) U.S. Cl. ............................. 349/62; 349/64; 349/65
(58) Field of Classification Search ................... 349/65, 349/62, 64
See application file for complete search history.

(56) References Cited

U.S. PATENT DOCUMENTS

| | | | |
|---|---|---|---|
| 4,673,254 A | | 6/1987 | Kato et al. |
| 5,396,350 A | * | 3/1995 | Beeson et al. .................. 349/62 |
| 6,011,602 A | * | 1/2000 | Miyashita et al. .............. 349/65 |
| 6,048,071 A | | 4/2000 | Sawayama |
| 6,049,649 A | | 4/2000 | Arai |
| 6,454,452 B1 | * | 9/2002 | Sasagawa et al. ............. 362/561 |
| 6,825,895 B2 | | 11/2004 | Nakano et al. |
| 2005/0041178 A1 | * | 2/2005 | Taniguchi et al. .............. 349/65 |
| 2005/0157516 A1 | | 7/2005 | Chen et al. |
| 2005/0180169 A1 | | 8/2005 | Saitoh et al. |
| 2006/0007302 A1 | | 1/2006 | Numata et al. |

(Continued)

FOREIGN PATENT DOCUMENTS

CN           1614471           5/2005

(Continued)

OTHER PUBLICATIONS

Non-Final Office Action of U.S. Appl. No. 12/049,774 issued on Mar. 30, 2010.

(Continued)

*Primary Examiner* — Wen-Ying P Chen
(74) *Attorney, Agent, or Firm* — H.C. Park & Associates, PLC

(57) ABSTRACT

Disclosed herein are a light guide plate and a backlight assembly using the same, which may improve the uniformity of light using prism patterns having a trapezoidal shape. The light guide plate includes a body, a plurality of first projections, and a plurality of second projections. The body includes an incident surface to which light is incident and an emitting surface from which the incident light is emitted. The plurality of first projections is disposed on the emitting surface of the body and has a trapezoidal shape in a section perpendicular to the incident surface. The plurality of second projections is disposed on the emitting surface of the body and has a shape symmetrical to a shape of the first projections.

18 Claims, 9 Drawing Sheets

U.S. PATENT DOCUMENTS

2008/0043170 A1 2/2008 Ikeda

FOREIGN PATENT DOCUMENTS

| | | |
|---|---|---|
| CN | 1617020 | 5/2005 |
| CN | 1702520 | 11/2005 |
| JP | 10282496 | 10/1998 |
| JP | 2006-128072 | 5/2006 |
| KR | 1020050044961 | 5/2005 |
| KR | 10-2006-0013318 | 2/2006 |
| KR | 1020060051190 | 5/2006 |

OTHER PUBLICATIONS

Final Office Action of U.S. Appl. No. 12/049,774 issued on Oct. 20, 2010.
Final Office Action of U.S. Appl. No. 12/049,774 issued on Apr. 14, 2011.
Notice of Allowance of U.S. Appl. No. 12/049,774 issued on Sep. 2, 2011.

* cited by examiner

LIGHT GUIDE PLATE AND BACKLIGHT ASSEMBLY USING THE SAME

CROSS-REFERENCE TO RELATED APPLICATION

This application claims priority from and the benefit of Korean Patent Application No. 10-2007-0026397, filed on Mar. 19, 2007, which is hereby incorporated by reference for all purposes as if fully set forth herein.

BACKGROUND OF THE INVENTION

1. Field of the Invention

The present invention relates to a light guide plate for a liquid crystal display (LCD) device and, more particularly, to a light guide plate and a backlight assembly using the same.

2. Discussion of the Background

Recently, information processing devices have been developed to have various shapes, various functions, and rapid information processing speeds. Such an information processing device requires a display device to display information processed in the form of electrical signals to a user.

A liquid crystal display (LCD) device is a flat panel display device that has various advantages including that it is lightweight, thin, and operates at low power consumption and a low driving voltage. Thus, LCDs have been widely used in various industrial applications.

An LCD device includes a display unit having an LCD panel to display an image and a backlight assembly to provide light to the LCD panel.

Typically, a backlight assembly includes a lamp to generate light and a light guide plate to guide the light generated from the lamp toward the LCD panel. The light generated from the lamp may be totally reflected in the light guide plate according to Snell's law, reflected by a reflector plate disposed at the bottom of the light guide plate, and emitted toward the LCD panel with a certain incident angle distribution.

A conventional backlight assembly may include a diffusion sheet to diffuse light and a prism sheet to refract and collect light to improve the uniformity of light emitted from the light guide plate and enhance brightness.

However, the diffusion sheet and the prism sheet used in the conventional backlight assembly may increase manufacturing costs and complicate the assembly process.

SUMMARY OF THE INVENTION

The present invention provides a light guide plate and a backlight assembly using the same, which may improve the uniformity of light by using prism patterns having a trapezoidal shape.

Additional features of the invention will be set forth in the description which follow, and in part will be apparent from the description, or may be learned by practice of the invention.

The present invention discloses a light guide plate including a body including an incident surface to which light is incident and an emitting surface from which the incident light is emitted, a plurality of first projections disposed on the emitting surface and having a trapezoidal shape in a section perpendicular to the incident surface, and a plurality of second projections having a shape symmetrical to a shape of the first projections.

The present invention also discloses a light guide plate including a body and a protrusion pattern. The body includes an incident surface to which light is incident, an emitting surface from which the incident light is emitted, and a reflecting surface facing the emitting surface. The protrusion pattern is disposed on the emitting surface and has a trapezoidal shape in a section perpendicular to the incident surface.

The present invention also discloses a backlight assembly including at least one lamp to generate light, a light guide plate, and a reflecting plate. The light guide plate includes an incident surface to which light generated from the lamp is incident, an emitting surface from which the incident light is emitted, a plurality of first projections disposed on the emitting surface and having a trapezoidal shape in a section perpendicular to the incident surface, and a plurality of second projections disposed on the emitting surface and having a shape symmetrical to a shape of the first projections. The reflecting plate is disposed at the bottom of the light guide plate to reflect light leaking from the light guide plate back to the light guide plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
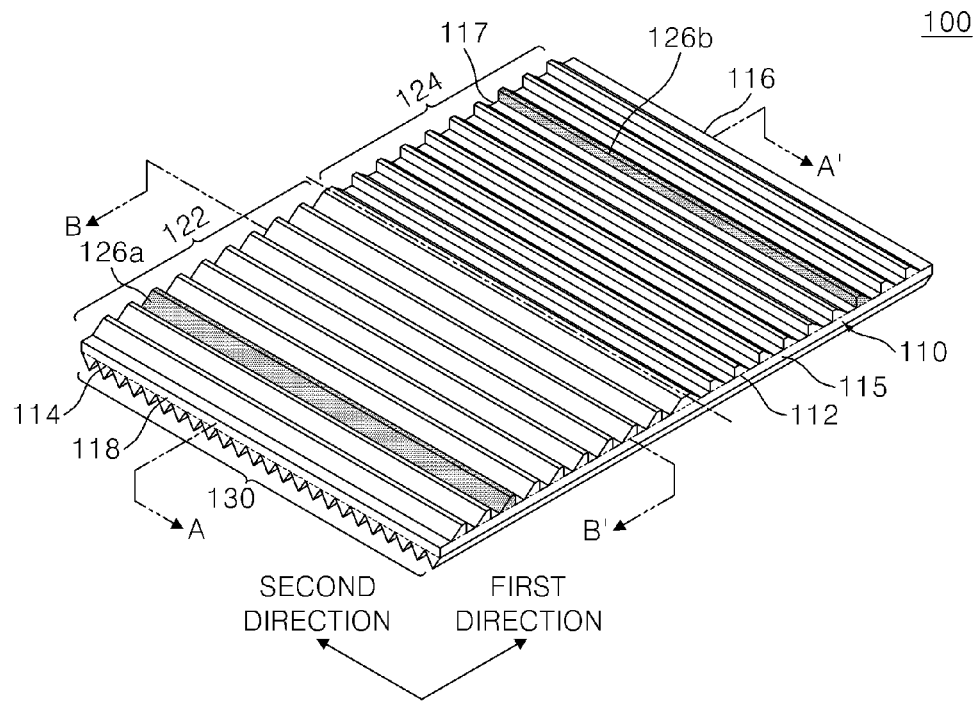
FIG. 1 is a perspective view of a light guide plate in accordance with an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative size of layers and regions may be exaggerated for clarity. Like reference numerals in the drawings denote like elements.

It will be understood that when an element such as a layer, film, region or substrate is referred to as being "on", "connected to", or "coupled to" another element or layer, it can be directly on, directly connected to, or directly coupled to the other element or layer, or intervening elements or layers may also be present. In contrast, when an element is referred to as being "directly on", "directly connected to", or "directly coupled to" another element or layer, there are no intervening elements or layers present.

Figure 2:
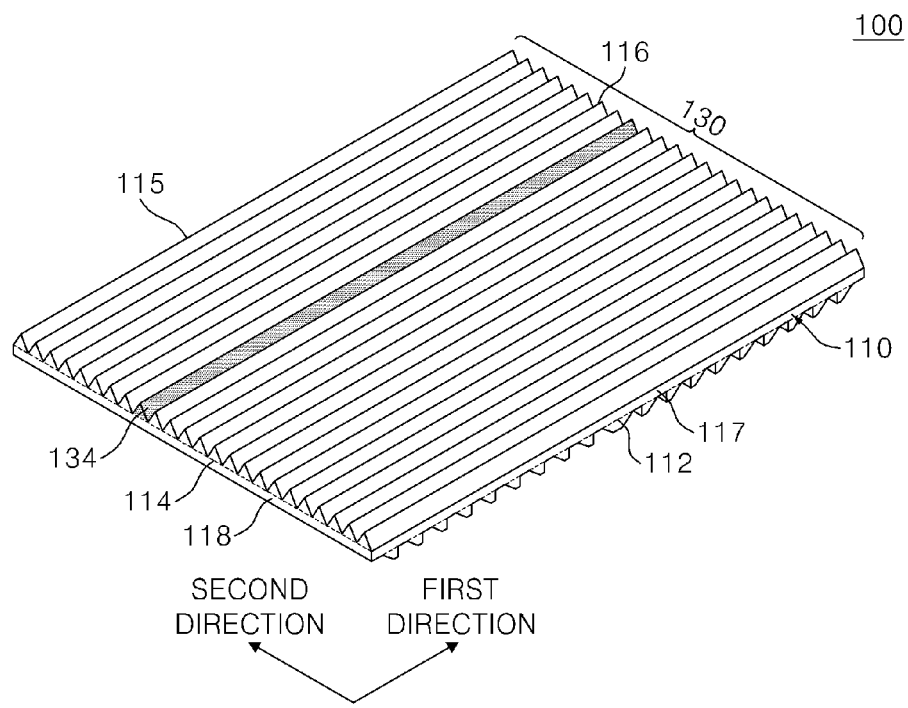
FIG. 2 is a rear perspective view of the light guide plate of FIG. 1.

FIG. 1 is a perspective view of a light guide plate in accordance with an exemplary embodiment of the present invention, and FIG. 2 is a rear perspective view of the light guide plate of FIG. 1. As shown in FIG. 1 and FIG. 2, the light guide plate 100 includes a body 110, a first prism pattern 122, a second prism pattern 124, and a third prism pattern 130.

The body 110 includes an incident surface to which light from a lamp (not shown) is incident, an emitting surface 112 from which the incident light is emitted, and a reflecting surface 114 facing the emitting surface 112. The incident surface corresponds to a lateral surface among first, second, third, and fourth lateral surfaces 115, 116, 117 and 118 on which the lamp generating light is disposed. The lamp may be disposed on the first lateral surface 115 and the third lateral surface 117 facing the first lateral surface 115.

The first and second prism patterns 122 and 124 are disposed on the emitting surface 112 to uniformly emit the light incident from the incident surface. The first and second prism patterns 122 and 124 are arranged symmetrical to each other with respect to the center of the longitudinal direction of the incident surface. The first prism pattern 122 includes a plurality of first projections 126a, and the second prism pattern 124 includes a plurality of second projections 126b. The first projections 126a and the second projections 126b are arranged parallel to each other. The first and second projections 126a and 126b may have trapezoidal prism shapes that extend in a second direction perpendicular to the incident surface and are symmetrical to each other with respect to the center of the longitudinal direction of the incident surface. Here, a first side of the trapezoid may have a length different from that of a second side facing the first side. The third prism pattern 130 is disposed on the reflecting surface 114 to increase the brightness of the incident light from the incident surface. The third prism pattern 130 includes a plurality of third projections 134. The third projections 134 may have a triangular prism shape extending in a second direction parallel to the incident surface.

The first and second prism patterns 122 and 124 disposed on the emitting surface 112 and the third prism pattern 130 disposed on the reflecting surface 114 will be described in more detail with respect to FIG. 3.

Figure 3:
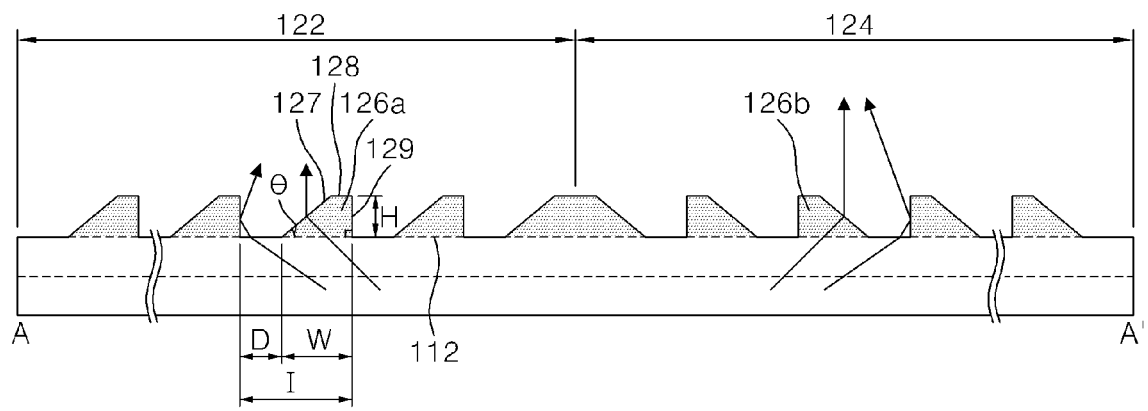
FIG. 3 is a cross-sectional view taken along line A-A' of FIG. 1.

FIG. 3 is a cross-sectional view, taken along line A-A' of FIG. 1, showing the first and second projections 126a and 126b of the first and second prism patterns 122 and 124. As shown in FIG. 3, the first prism pattern 122 including the plurality of first projections 126a and the second prism pattern 124 including the plurality of second projections 126b are disposed on the emitting surface 112 of the light guide plate 100.

Each first and second projection 126a and 126b includes an inclined surface 127 inclined with respect to the emitting surface 112, a vertical surface 129 perpendicular to the emitting surface 112, and a horizontal surface 128 parallel to the emitting surface 112. That is, each first and second projection 126a and 126b has a trapezoidal sectional shape including a bottom side corresponding to the section of the emitting surface 112, an inclined side corresponding to the section of the inclined surface 127, and a horizontal side corresponding to the section of the horizontal surface 128, and a vertical side corresponding to the section of the vertical surface 129. Here, the inclined side and the vertical side 127 and 129 correspond to the first and second sides described in FIG. 1 and FIG. 2.

The inclined surfaces 127 of the first and second projections 126a and 126b guide the light emitted to the left and right to be emitted in the vertical direction. The vertical surfaces 129 of the first and second projections 126a and 126b guide the light emitted to the left and right toward the center of the longitudinal direction of the incident surface. The horizontal surfaces 128 of the first and second projections 126a and 126b diffuse emitted light and provide surfaces on which an optical sheet (not shown) is placed during assembly of a backlight assembly.

Since the first and second projections 126a and 126b disposed on the light guide plate 100 in accordance with the exemplary embodiment of the present invention are arranged symmetrical to each other, it may be possible to improve the left-right viewing angle of a display device, in which the light guide plate 100 is used, by adjusting the light emission distribution so that the light emitted to the left and right may be directed in a central direction.

The shapes of the first and second projections 126a and 126b that may improve the left-right viewing angle can be determined from the following Table 1, which shows experimental values. In this case, adjustable variables include an angle θ formed by the emitting surface 112 and the inclined surface 127, a height H of the vertical surface 129, a width W of each first and second projection 126a and 126b, and an interval I at which the first and second projections 126a and 126b are disposed. The height H of the vertical surface 129 is measured from the emitting surface 112. The interval I is the sum of the width W of a projection 126a or 126b and a distance D between the first and second projections 126a and 126b.

TABLE 1

| Interval (I) | Width (W) | Height (H) | Angle (θ) | TCO standard | Brightness |
|---|---|---|---|---|---|
| No first and second prism patterns | | | | 1.65 | 1 |
| 150 μm | 100 μm | 40 μm | 50° | 1.74 | 0.93 |
| 200 μm | 100 μm | 40 μm | 41.5° | 2.22 | 1 |
| 200 μm | 100 μm | 40 μm | 50° | 1.52 | 0.94 |
| 200 μm | 100 μm | 20 μm | 50° | 1.68 | 1.02 |
| 200 μm | 100 μm | 10 μm | 50° | 1.58 | 1.03 |
| 200 μm | 100 μm | 40 μm | 55° | 1.78 | 0.96 |
| 200 μm | 100 μm | 60 μm | 55° | 1.81 | 0.85 |
| 200 μm | 100 μm | 40 μm | 60° | 1.6 | 0.99 |
| 300 μm | 100 μm | 40 μm | 50° | 1.7 | 0.98 |

The TCO standard required by the Swedish Confederation of Professional Employees shown in Table 1 relates to the viewing angle of a monitor, and generally it should be less than 1.7. The variables relating to the shape of the first and second projections 126a and 126b that may be adjusted to satisfy the TCO standard of less than 1.7 are as follows.

The angle θ formed by the emitting surface 112 and the inclined surface 127 may be in the range of about 45° to about 60°, for example, about 50°. The height H of the vertical surface 129 may be in the range of about 10 to about 60 µm. Moreover, the first and second projections 126a and 126b may be arranged at intervals I in the range of about 170 µm to about 230 µm, for example, 200 µm.

When the angle θ formed by the emitting surface 112 and the inclined surface 127 is 50°, the height H of the vertical surface 129 is 10 µm, the width W of each projection 126 is 100 µm, and the interval I at which the first and second projections 126a and 126b are disposed is 200 µm, the TCO standard is 1.58 and the brightness is 1.03. Accordingly, the TCO standard and the brightness of the light guide plate 100 in accordance with the exemplary embodiment of the present invention may be improved as compared to a conventional light guide plate having no first and second prism patterns 122 and 124.

Figure 4:
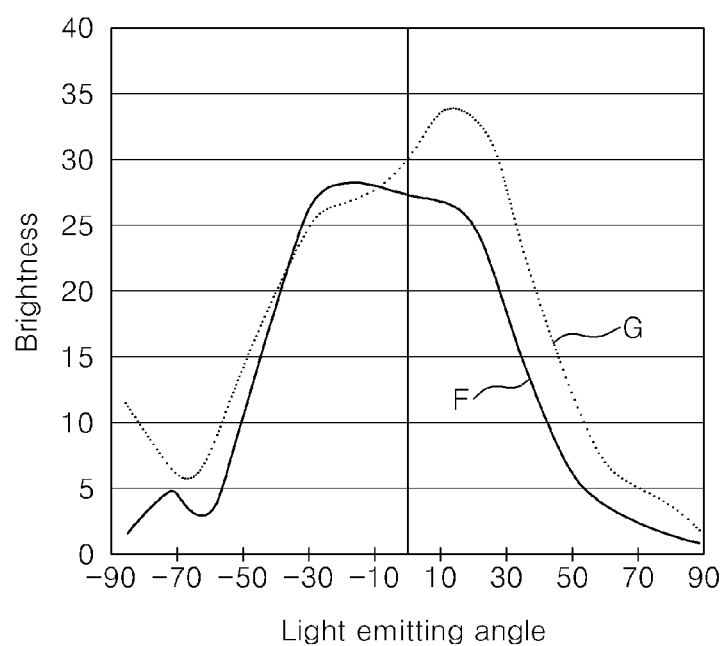
FIG. 4 is a graph showing the change in brightness with respect to the light incident angle in a second prism pattern shown in FIG. 3.

FIG. 4 is a graph showing the change in brightness, which indicates the light emission distribution of the light guide plate, with respect to the light emitting angle in the second prism pattern shown in FIG. 3, wherein curve G shows the change in brightness of the conventional light guide plate having no second prism pattern, and curve F shows the change in brightness of the light guide plate having the second prism pattern.

Referring to FIG. 4, it can be seen that the light emission distribution of the light guide plate 100 can be adjusted by the second projections 126b of the second prism pattern 124 in accordance with the exemplary embodiment of the present invention. That is, curve F shows that the light emission distribution is moved to the left as compared to the light emission distribution shown by curve G.

Meanwhile, the light emission distribution may be adjusted by the first prism pattern 122 as with the second prism pattern 124. Since the first prism pattern 122 has a shape that is symmetrical to the second prism pattern 124, the light emission distribution (not shown) is moved to the right of the light emission distribution shown by of curve G shown in FIG. 4.

Accordingly, the light guide plate 100 in accordance with the exemplary embodiment of the present invention can concentrate the light emission distribution on the central area by the first projections 126a of the first prism pattern 122 and the second projections 126b of the second prism pattern 124.

Figure 5A:
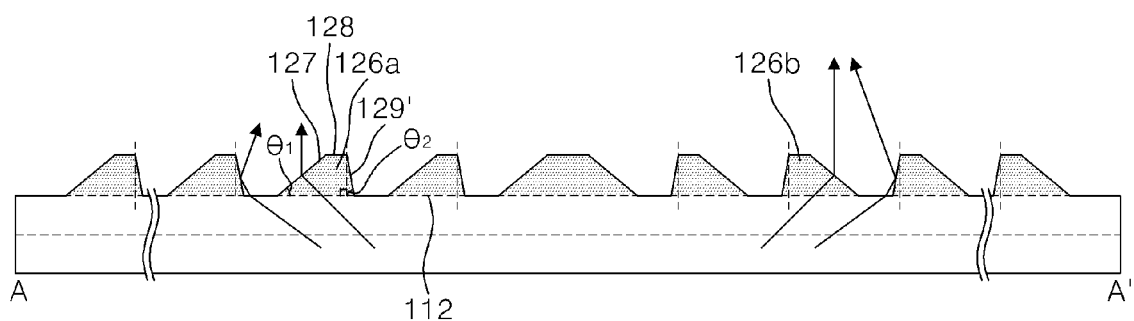
FIG. 5A, FIG. 5B, and FIG. 5C are cross-sectional views of other light guide plates taken along line A-A' of FIG. 1.
Figure 5B:
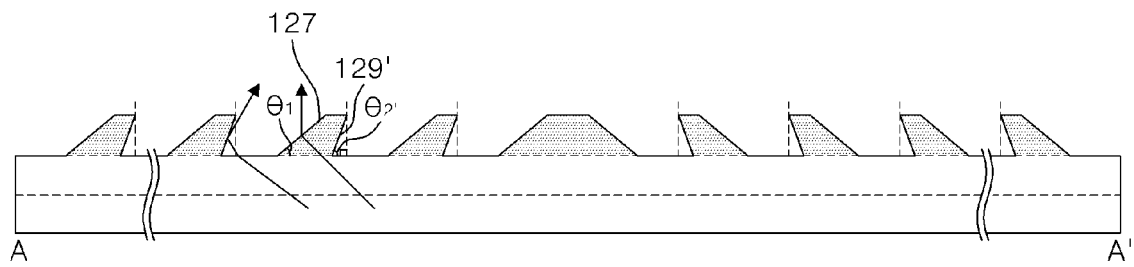
Figure 5C:
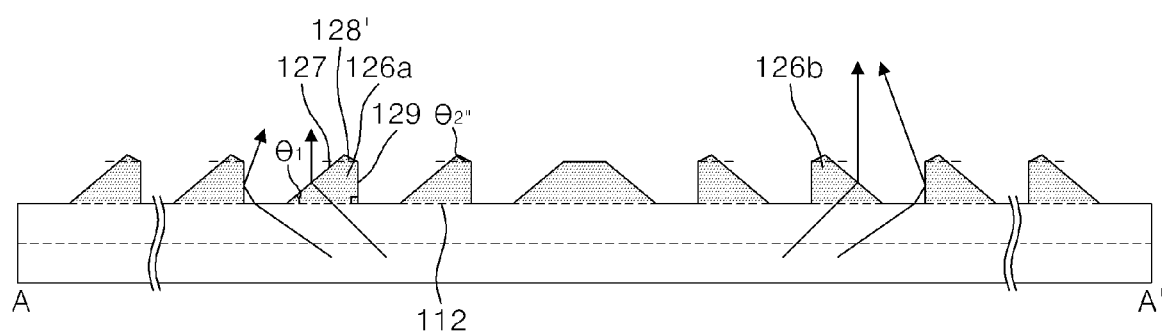

FIG. 5A, FIG. 5B, and FIG. 5C are cross-sectional views of other light guide plates taken along line A-A' of FIG. 1. First, referring to FIG. 5A, the light guide plate 100 of another type in accordance with the exemplary embodiment of the present invention includes a plurality of first and second projections 126a and 126b arranged symmetrical to each other. Each first and second projection 126a and 126b includes a first inclined surface 127 forming a first inclined angle $\theta_1$ with the emitting surface 112, a second inclined surface 129' forming a second inclined angle $\theta_2$ with the emitting surface 112, and a horizontal surface 128 connecting the first inclined surface 127 and the second inclined surface 129'. The horizontal surface 128 is parallel to the emitting surface 112.

That is, each first and second projection 126a and 126b of the light guide plate 100 of FIG. 5A includes first and second inclined surfaces 127 and 129' inclined to the emitting surface 112. The sections of the first and second inclined surfaces 127 and 129' correspond to the first and second sides, respectively, described in FIG. 1 and FIG. 2.

The first inclined angle $\theta_1$ formed by the first inclined surface 127 and the emitting surface 112 may be smaller than the second inclined angle $\theta_2$ formed by the second inclined surface 129' and the emitting surface 112. The second inclined surface 129' corresponds to the vertical surface 129 described in FIG. 3. The second inclined surface 129' reflects light to be concentrated on the central area. The second inclined angle $\theta_2$ provides a process margin in the manufacturing process of the light guide plate 100.

Although the second inclined surface 129' is inclined toward the first inclined surface 127 in FIG. 5A, the second inclined surface 129' may be inclined in another direction. For example, the second inclined surface 129' may have a second inclined angle $\theta_{2'}$ inclined in the opposite direction toward the first inclined surface 127. At this time, the second inclined angle $\theta_{2'}$ may be greater than the first inclined angle $\theta_1$, which is shown in FIG. 5B.

The light guide plate 100 of FIG. 5C includes a plurality of first and second projections 126a and 126b arranged symmetrical to each other. Each first and second projection 126a and 126b includes a first inclined surface 127 forming a first inclined angle $\theta_1$ with the emitting surface 112, a vertical surface 129 perpendicular to the emitting surface 112, and a second inclined surface 128' connecting the first inclined surface 127 and the vertical surface 129 and forming a second inclined angle $\theta_{2''}$ with respect to the emitting surface 112. The sections of the first inclined surfaces 127 and the vertical surface 129 correspond to the first and second sides, respectively, described in FIG. 1 and FIG. 2.

Each first and second projection 126a and 126b of the light guide plate 100 of FIG. 5C includes the second inclined surface 128' connecting the first inclined surface 127 and the vertical surface 129. Here, the second inclined surface 128' corresponds to the horizontal surface 128 described in FIG. 3. The second inclined angle $\theta_{2''}$ formed by the second inclined surface 128' and the emitting surface 112 provides a process margin in the manufacturing process of the light guide plate 100.

Figure 6:
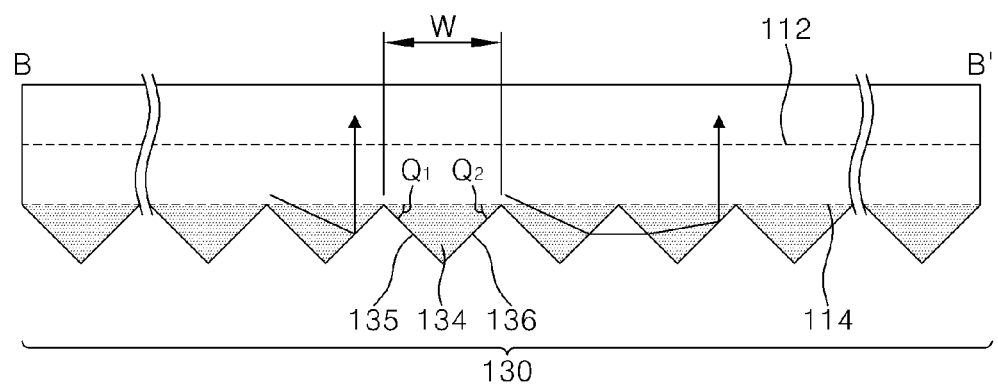
FIG. 6 is a cross-sectional view taken along line B-B' of FIG. 1.

FIG. 6 is a cross-sectional view, taken along line B-B' of FIG. 1, to show the third projections 134 of the third prism pattern 130. As shown in FIG. 6, the third prism pattern 130 including a plurality of third projections 134 is disposed on the reflecting surface 114 of the light guide plate 100.

Each third projection 134 includes a first inclined surface 135 forming a first angle $Q_1$ with the reflecting surface 114, and a second inclined surface 136 forming a second angle $Q_2$ with the reflecting surface 114. The first angle $Q_1$ and the second angle $Q_2$ may be the same.

That is, the section of the third projections 134 may be an isosceles triangle including a first inclined side corresponding to the section of the first inclined surface 135, a second inclined side corresponding to the section of the second inclined surface 136, and a bottom side of the triangle corresponding to a section of the reflecting surface 114.

The first and second inclined surfaces 135 and 136 of the third projections 134 reflect or refract light leaking from the light guide plate 100 to the reflecting surface 114 to be emitted toward the emitting surface 112. That is, the third projections 134 of the light guide plate 100 in accordance with the exemplary embodiment of the present invention have a structure that may improve the brightness of the display device, in which the light guide plate 100 is used, by reflecting or refracting the light.

The shape of the third projections 134 that will improve the left-right viewing angle can be determined by experimental values. In this case, adjustable variables include a first angle $Q_1$ formed by the reflecting surface 114 and the first inclined surface 135, a second angle $Q_2$ formed by the reflecting surface 114 and the second inclined surface 136, and a width W of the third projection 134.

Figure 7:
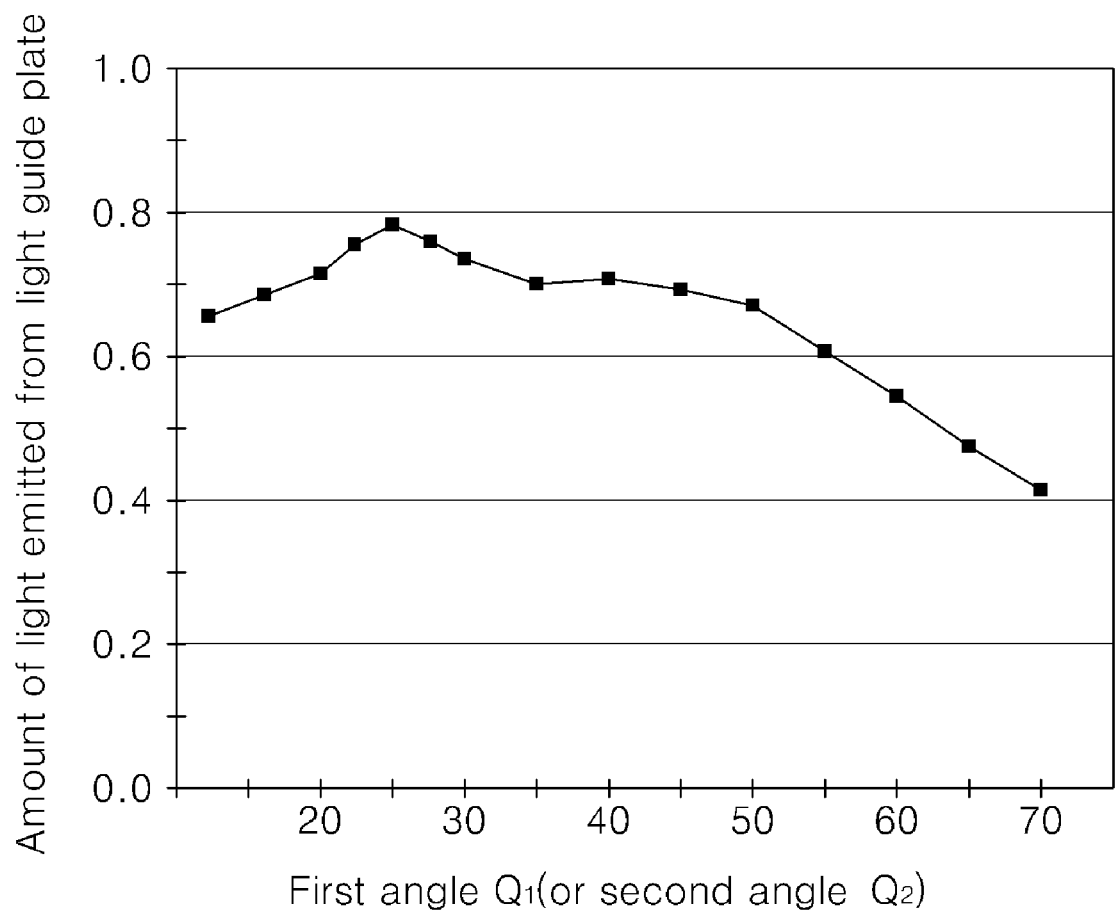
FIG. 7 is a graph showing the change in the amount of light emitted from the light guide plate with respect to the change of a first angle (or second angle) shown in FIG. 6.

FIG. 7 is a graph showing the change in the amount of light emitted from the light guide plate with respect to the change of the first angle $Q_1$ (or second angle $Q_2$) shown in FIG. 6.

Referring to FIG. 7, the light guide plate 100 emits light uniformly when the first angle $Q_1$ (or second angle $Q_2$) is in the range of about 20° to about 50°. Accordingly, the first and second angles $Q_1$ and $Q_2$ of each third projection 134 may be selected from the range of about 20° to about 50° and, for example, about 25°.

Meanwhile, the width W of the third projection 134 may be selected from the range of about 10 μm to about 300 μm in view of the visibility of the pattern.

Figure 8A:
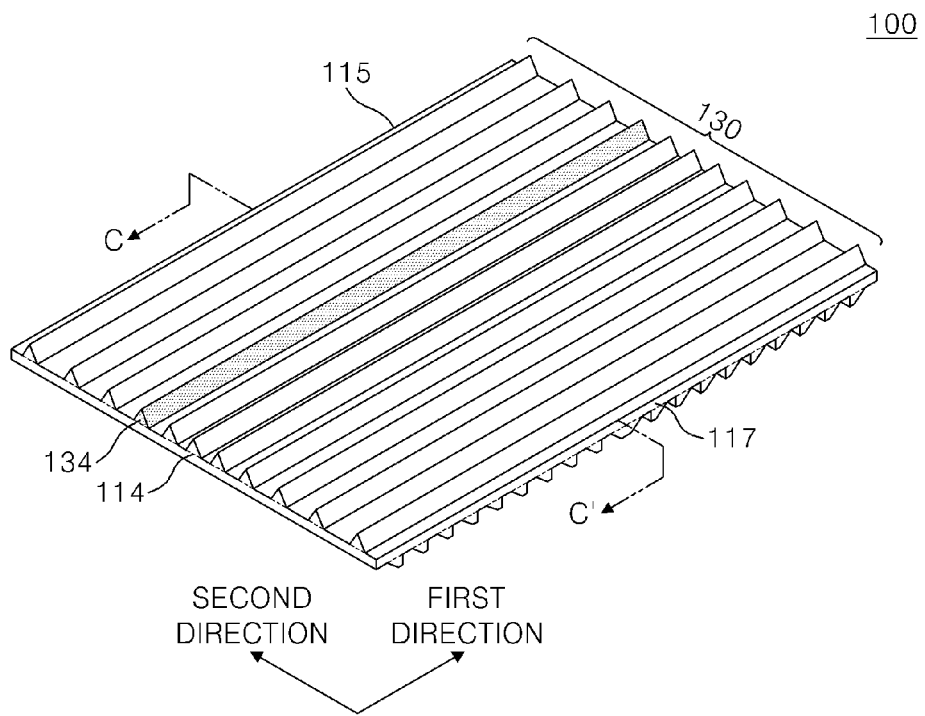
FIG. 8A is a rear perspective view of a light guide plate in accordance with another embodiment of the present invention.
Figure 8B:
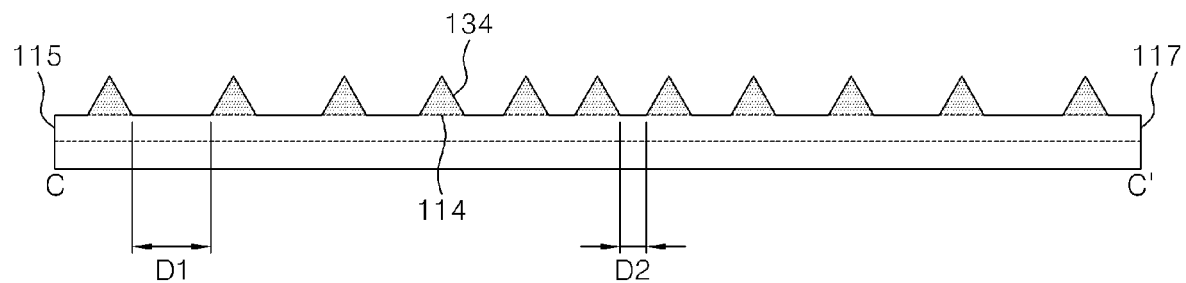
FIG. 8B is a cross-sectional view taken along line C-C' of FIG. 8A.

FIG. 8A is a rear perspective view of a light guide plate in accordance with another exemplary embodiment of the present invention, and FIG. 8B is a cross-sectional view taken along line C-C' of FIG. 8A. As shown in FIG. 8A and FIG. 8B, the light guide plate 100 includes a third prism pattern 130 disposed on the reflecting surface 114. The third prism pattern 130 includes a plurality of third projections 134 having a triangular prism shape extending in a first direction parallel to the incident surface.

The third projections 134 are spaced apart from each other at a predetermined distance. The distance between the third projections 134 may decrease going away from the incident surface. For example, when a lamp (not shown) is disposed on first and third lateral surfaces 115 and 117 of the light guide plate 100, the distance D1 between the third projections 134 adjacent to the first and third lateral surfaces 115 and 117 may be greater than the distance D2 between the third projections 134 positioned in the middle of the first and third lateral surfaces 115 and 117.

Since the third projections 134 disposed on the reflecting surface 114 emit light in the vertical direction, if the third projections 134 are disposed successively, a phenomenon in which the central area is displayed darker may occur. The reason for this is that most of the light is emitted by the third projections 134 located adjacent to the incident surface and the amount of light reaching the third projections 134 positioned in the central area, which are relatively far away from the incident surface, is reduced.

Accordingly, it may be possible to prevent the central area from being displayed darker by increasing the density of the third projections 134 of the light guide plate 100 in accordance with another exemplary embodiment of the present invention disposed in the central area more than those disposed in the area adjacent to the incident surface. The third projections 134 may be arranged at intervals selected from the range of about 50 μm to about 1000 μm.

Figure 9A:
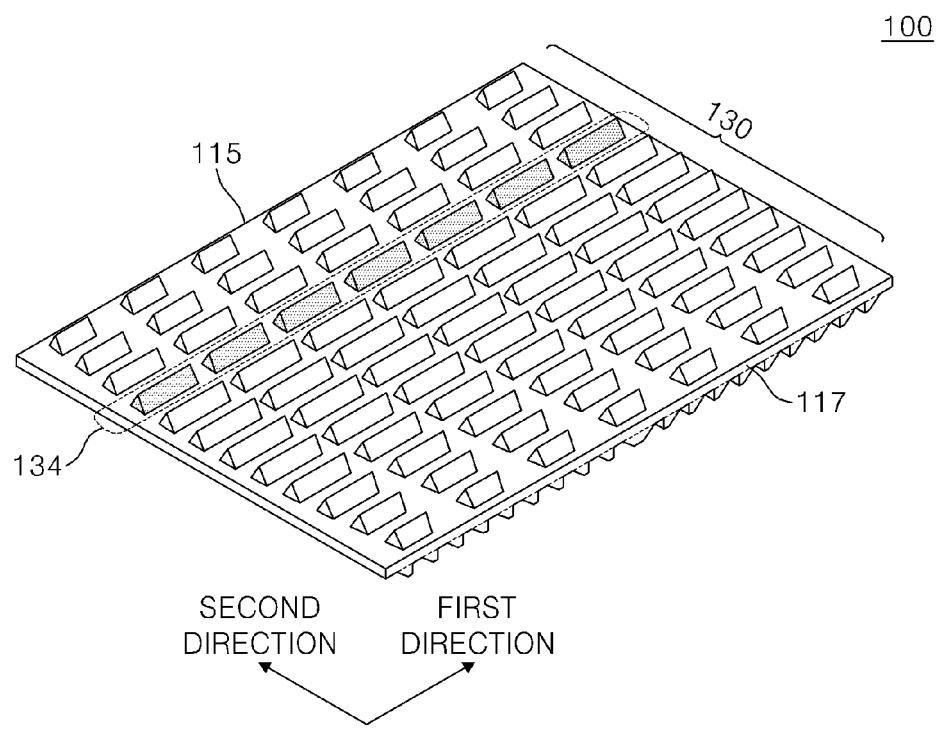
FIG. 9A is a rear perspective view of a light guide plate in accordance with an exemplary embodiment of the present invention.
Figure 9B:
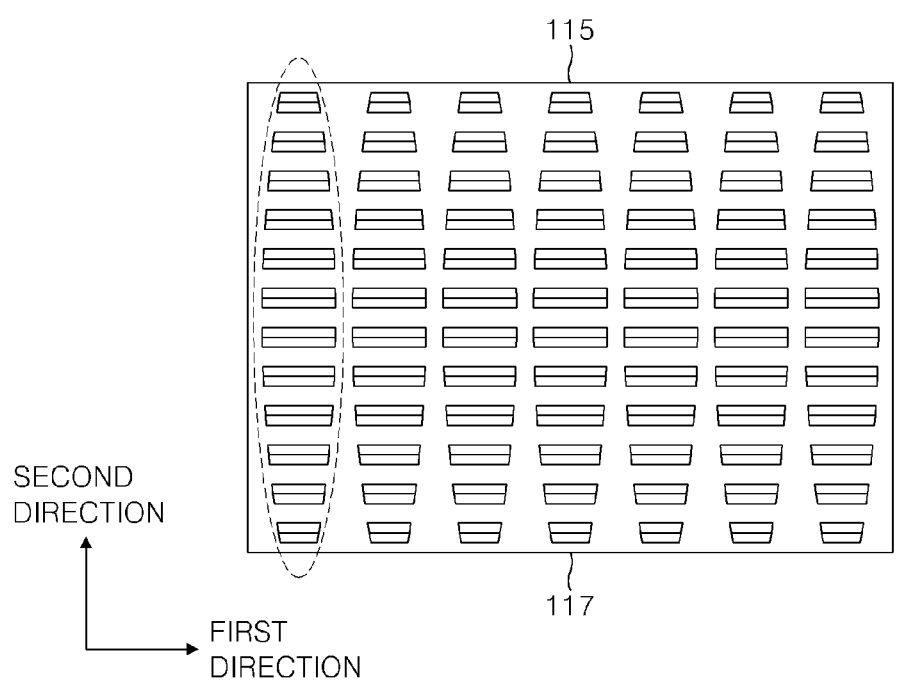
FIG. 9B is a rear plan view of the light guide plate of FIG. 9A.

FIG. 9A is a rear perspective view of a light guide plate in accordance with a further exemplary embodiment of the present invention, and FIG. 9B is a rear plan view of the light guide plate of FIG. 9A. As shown in FIG. 9A and FIG. 9B, the light guide plate 100 includes a third prism pattern 130 having another shape disposed on the reflecting surface 114. The third prism pattern 130 includes a plurality of third projections 134 each of which has triangular prisms disposed in a first direction parallel to the incident surface.

The triangular prisms are grouped in a second direction perpendicular to the incident surface. The triangular prisms may increase in length as going away from the incident surface. For example, when a lamp (not shown) is disposed on first and third lateral surfaces 115 and 117 of the light guide plate 100, the length of the triangular prisms may increase approaching the central area between the first and third lateral surfaces 115 and 117.

Accordingly, it may be possible to prevent the central area from being displayed darker by increasing the length of the triangular prism of the third projection 134 of the light guide plate 100 in accordance with a further exemplary embodiment of the present invention disposed in the central area more than those disposed in the area adjacent to the incident surface.

Figure 10:
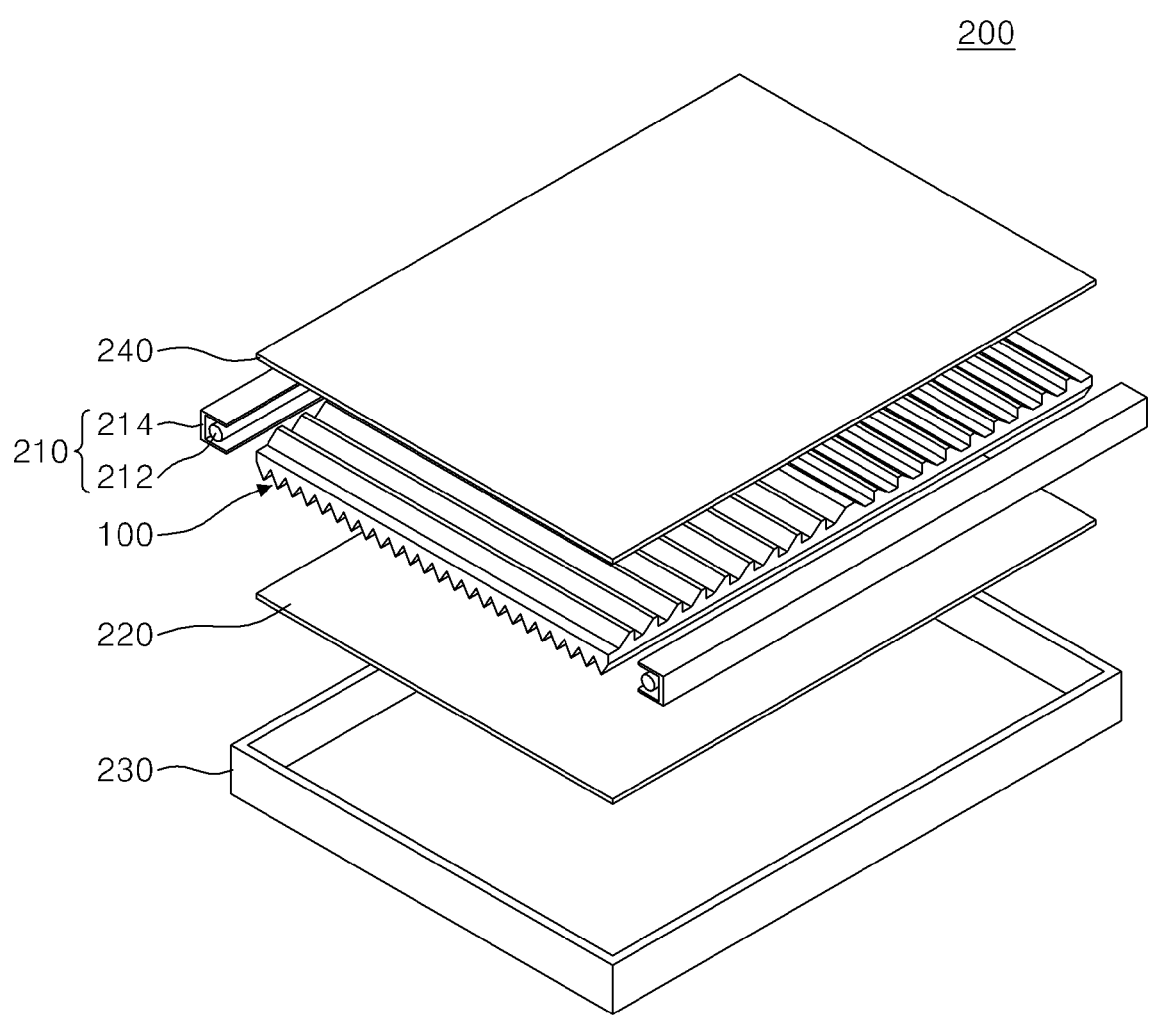
FIG. 10 is an exploded perspective view of a backlight assembly in accordance with an exemplary embodiment of the present invention.

FIG. 10 is an exploded perspective view of a backlight assembly in accordance with an exemplary embodiment of the present invention. As shown in FIG. 10, the backlight assembly 200 includes a lamp unit 210, a light guide plate 100, a reflecting sheet 220, an optical sheet 240, and a receptacle 230.

The lamp unit 210 includes at least one lamp 212 and at least one lamp reflecting plate 214. The lamp unit 210 may be disposed on one side of the light guide plate 100 or on two sides of the light guide plate 100 that face each other according to a desired brightness.

The lamp 212 is a light source to generate light and may be a cold cathode fluorescent lamp (CCFL) having a bar shape. The lamp reflecting plate 214 reflects light generated from the lamp 212 to the light guide plate 100 to improve the light utilization efficiency. Accordingly, the lamp reflecting plate 214 may be formed of a material having a high reflectivity or may be a reflecting member coated on a cover surface covering the lamp 212.

The light guide plate 100 changes the path of light incident from the lamp unit 210 so that it is emitted in one direction. The light guide plate 100 may be any one of the above-described light guide plates.

The reflecting sheet 220 is placed at the bottom of the light guide plate 100 to reflect the light leaking from the light guide plate 100 back to the light guide plate 100. The optical sheet 240 is placed on the top of the light guide plate 100 to improve the characteristics of the light emitted from the light guide plate 100.

The receptacle 230 receives the lamp unit 210, the optical sheet 240, the light guide plate 100, and the reflecting sheet 220.

Since the backlight assembly 200 in accordance with the exemplary embodiment of the present invention uses the light guide plate 100 including the first and second projections 126a and 126b to adjust the light emission distribution and the third projections 134 to improve the light efficiency, it may be possible to reduce the number of optical sheets 240. Accordingly, the backlight assembly 200 of the present invention may make it possible to reduce the manufacturing costs and the number of assembly processes as compared to a conventional light guide plate using more than three optical sheets, such as a diffusion sheet, a prism sheet, a protective sheet, and the like.

The following Table 2 shows the brightness characteristics of a conventional backlight assembly and the backlight assembly of an exemplary embodiment of the present invention. Here, the conventional backlight assembly includes a light guide plate, which does not have first, second, and third projections, and three optical sheets, and the backlight assembly of the exemplary embodiment of the present invention includes a light guide plate having first, second, and third projections and one optical sheet.

TABLE 2

| Item | Conventional backlight assembly | Backlight assembly of the present invention |
|---|---|---|
| Average brightness of 25 points (nit) | 4687.80 | 5129.87 |
| Comparison in average brightness of 25 points (%) | 100 | 109.43 |

TABLE 2-continued

| Item | Conventional backlight assembly | Backlight assembly of the present invention |
|---|---|---|
| Center point brightness (nit) | 5151.00 | 5323.32 |
| Comparison in brightness of center point (%) | 100 | 103.35 |

As shown in Table 2, according to the measurement of the brightness at the 25 points and the center point of the conventional backlight assembly and the backlight assembly of the exemplary embodiment of the present invention, it can be understood that the backlight assembly of the exemplary embodiment of the present invention shows improved brightness characteristics as compared to the conventional backlight assembly. The twenty five points are selected from the conventional backlight assembly and the backlight assembly of the exemplary embodiment of the present invention to measure the average brightness.

In more detail, the backlight assembly of the exemplary embodiment of the present invention shows about 9.43% improvement in the average brightness of the twenty five points and about 3.35% improvement in the center point brightness as compared to the conventional backlight assembly.

Figure 11:
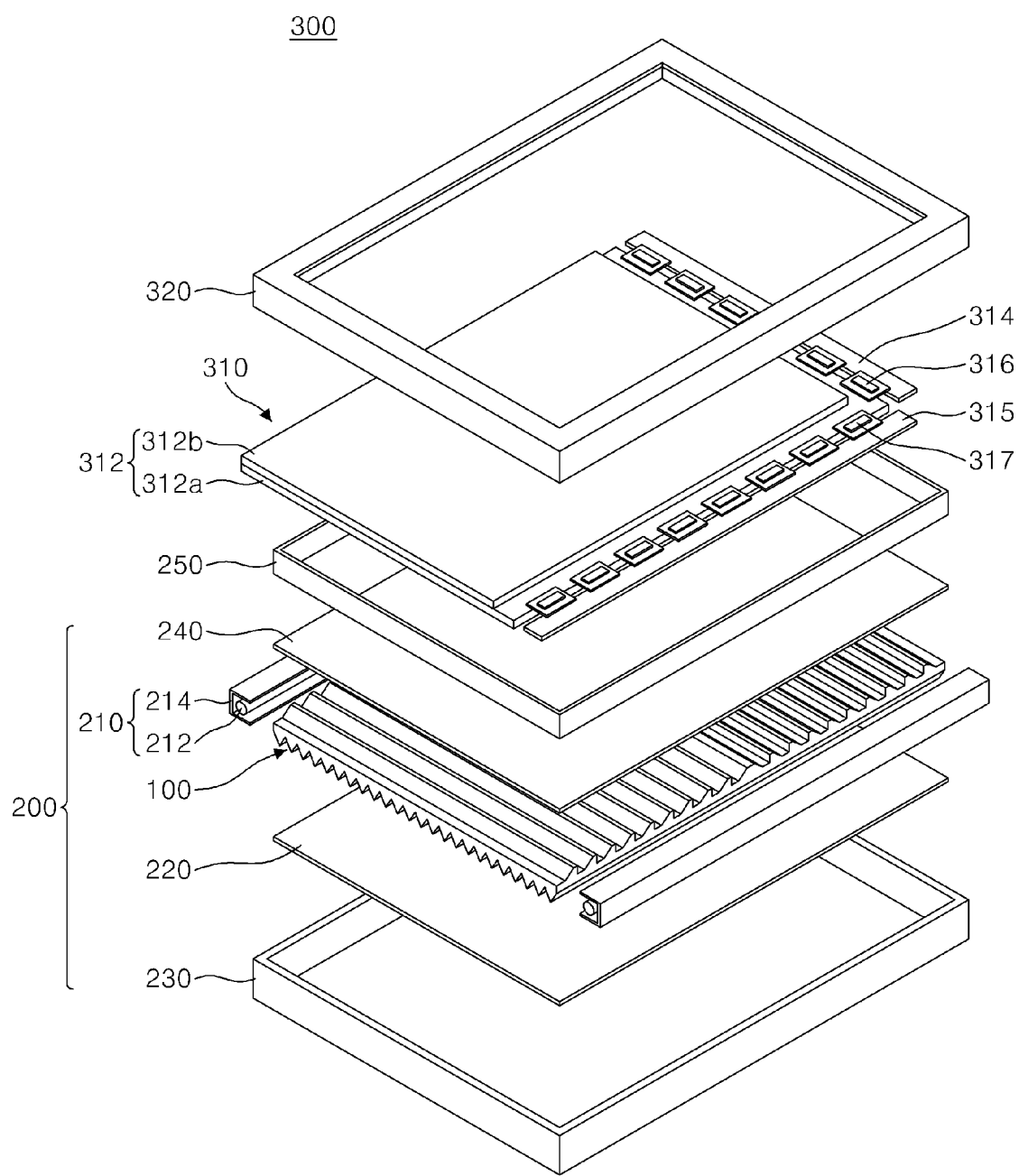
FIG. 11 is an exploded perspective view of a liquid crystal display device in accordance with an exemplary embodiment of the present invention.

FIG. 11 is an exploded perspective view of a liquid crystal display device in accordance with an exemplary embodiment of the present invention. As shown in FIG. 11, the liquid crystal display (LCD) device 300 includes a display unit 310 to display an image, a backlight assembly 200 to provide light to the display unit 310, and a top chassis 320. Since the backlight assembly 200 has the same structure as that of FIG. 10, a detailed description thereof will be omitted.

The display unit 310 includes an LCD panel 312 to display an image, a data printed circuit board (PCB) 314 and a gate PCB 315 to provide driving signals for driving the LCD panel 312. The data PCB 314 and the gate PCB 315 are connected to the LCD panel 312 through a data tape carrier package (TCP) 316 and a gate TCP 317, respectively.

The LCD panel 312 includes a thin film transistor (TFT) substrate 312a, a color filter substrate 312b facing the TFT substrate 312a, and a liquid crystal layer (not shown) disposed between the TFT substrate 312a and the color filter substrate 312b. The TFT substrate 312a includes a plurality of TFTs serving as switching elements (not shown) arranged in a matrix form thereon. A source terminal and a gate terminal of the TFT are connected to a data line and a gate line, respectively, and a drain terminal of the TFT is coupled to a pixel electrode, which may be made of a transparent conductive material.

The color filter substrate 312b includes RGB pixels, which may be formed by a thin film process. The color filter substrate 312b includes a common electrode, which may be made of a transparent conductive material.

The display unit 310 with the above-described configuration is mounted on the top of a middle mold 250 to fix the optical sheet 240 and is fixed by connecting the top chassis 320 and the receptacle 230.

As described above, since the light guide plate and the backlight assembly using the same in accordance with exemplary embodiments of the present invention have a structure that adjusts the light emission distribution using the prism patterns having a trapezoidal shape, it may be possible to improve the viewing angle characteristics.

It will be apparent to those skilled in the art that various modifications and variations can be made in the present invention without departing from the spirit or scope of the invention. Thus, it is intended that the present invention cover the modifications and variations of this invention provided the come within the scope of the appended claims and their equivalents.

What is claimed is:

1. A light guide plate, comprising:
a body comprising an incident surface to which light is incident and an emitting surface from which the incident light is emitted;
a plurality of first projections disposed on the emitting surface and having a trapezoidal shape in a section perpendicular to the incident surface; and
a plurality of second projections having a shape that is symmetrical to a shape of the first projections,
wherein each first projection and each second projection comprises a first surface inclined with the emitting surface, a second surface extending from the first surface, and a third surface extending to the emitting surface, and an inner angle formed by the first surface and the emitting surface is different from an inner angle formed by the third surface and the emitting surface.

2. The light guide plate of claim 1, wherein the inner angle formed by the emitting surface and the first surface is in a range of about 45° to about 60°.

3. The light guide plate of claim 1, wherein the second surface is substantially parallel to the emitting surface.

4. The light guide plate of claim 3, wherein the third surface is substantially perpendicular to the emitting surface.

5. The light guide plate of claim 3, wherein the third surface is inclined with the emitting surface.

6. The light guide plate of claim 5, wherein the third surface is inclined toward the first surface.

7. The light guide plate of claim 1, wherein each first projection has a height in a range of about 10 μm to about 60 μm.

8. The light guide plate of claim 1, wherein the first projections and the second projections are arranged parallel to each other.

9. The light guide plate of claim 1, wherein the first projections and the second projections are spaced apart from each other.

10. The light guide plate of claim 9, wherein the interval of the projections is about 170 μm to about 230 μm.

11. The light guide plate of claim 1, further comprising a reflecting surface facing the emitting surface and disposed on the body, and a plurality of third projections disposed on the reflecting surface.

12. The light guide plate of claim 11, wherein each third projection has a triangular prism shape extending in a direction parallel to the incident surface.

13. The light guide plate of claim 11, wherein the third projections are arranged spaced apart from each other.

14. The light guide plate of claim 13, wherein the distance between the third projections decreases going away from the incident surface.

15. The light guide plate of claim 11, wherein each third projection has a plurality of triangular prisms disposed in a direction parallel to the incident surface.

16. The light guide plate of claim 15, wherein the triangular prisms increases in length as going away from the incident surface.

17. The light guide plate of claim 1, wherein the first projections are disposed on the left side with respect to a center line of the emitting surface and the second projections are disposed on the right side with respect to the center line of the emitting surface.

18. A backlight assembly comprising:
- at least one lamp to generate light;
- a light guide plate comprising an incident surface to which light generated from the lamp is incident, an emitting surface from which the incident light is emitted, a plurality of first projections disposed on the emitting surface and having a trapezoidal shape in a section perpendicular to the incident surface, and a plurality of second projections disposed on the emitting surface and having a shape that is symmetrical to a shape of the first projections; and
- a reflecting plate disposed at the bottom of the light guide plate to reflect light leaking from the light guide plate back to the light guide plate, wherein each first projection and each second projection comprises a first surface inclined with the emitting surface, a second surface extending from the first surface, and a third surface extending to the emitting surface, and an inner angle formed by the first surface and the emitting surface is different from an inner angle formed by the third surface and the emitting surface.

* * * * *